Figure 1:
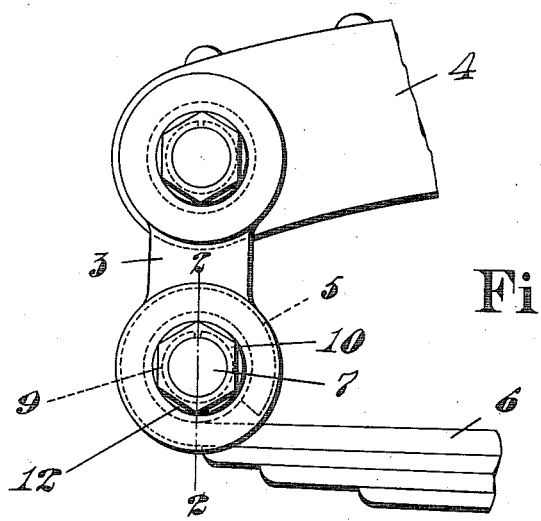

E. H. DELLING.
SPRING SHACKLE.
APPLICATION FILED DEC. 9, 1918.

1,296,778.

Patented Mar. 11, 1919.

INVENTOR
Erik H. Delling.
By his Attorney,
J. H. McCrady.

UNITED STATES PATENT OFFICE.

ERIK H. DELLING, OF NEWTON, MASSACHUSETTS.

SPRING-SHACKLE.

1,296,778.   Specification of Letters Patent.   Patented Mar. 11, 1919.

Application filed December 9, 1918. Serial No. 265,906.

*To all whom it may concern:*

Be it known that I, ERIK H. DELLING, a subject of the King of Norway, residing at Newton, in the county of Middlesex and State of Massachusetts, have invented certain Improvements in Spring-Shackles, of which the following description, in connection with the accompanying drawings, is a specification, like reference characters on the drawings indicating like parts in the several figures.

Users of motor vehicles are only too familiar with the annoying rattles that develop in various parts of the vehicle and which are particularly noticeable when the vehicle runs over crossings or rough places in the road. Such noises may originate in a great many of the connections and joints in the vehicle but the source of a substantial percentage of them is in the spring shackles. While these parts are commonly regarded as relatively stationary, they are constantly subject to small movements and vibrations which, combined with the heavy pressures transmitted through them, soon wear the parts sufficiently to develop a certain amount of play which, of course, results in a rattle. This is true even of high-grade vehicles in which the spring shackles receive careful attention in manufacture, both as to materials and workmanship, and it is especially noticeable in trucks and other vehicles using solid tires.

To devise a spring shackle which will obviate these difficulties and cure these defects, constitutes the chief object of this invention. The invention further aims to devise a construction of this character which can be more economically manufactured and more readily assembled than the constructions heretofore proposed.

The invention will be readily understood from the following description of the embodiment thereof at present preferred and the novel features will be particularly pointed out in the appended claims.

Figure 2:
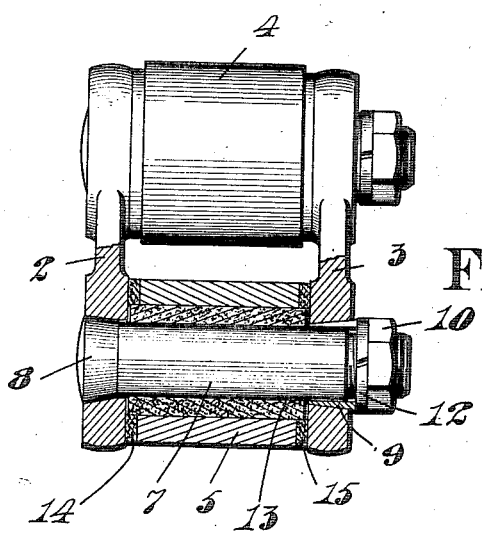

Referring now to the accompanying drawings,

Figure 1 is a side elevation of a spring shackle construction embodying this invention; and Fig. 2 is a view, partly in front elevation and partly in cross section on the line 2—2, Fig. 1.

The construction shown comprises two shackle links designated at 2 and 3, respectively, these links being supported at their upper ends by a hanger arm 4, and at their lower ends supporting the eye 5 of the master leaf 6 of a vehicle spring. The connection between the shackle links and the spring eye 5 consists of a bolt 7 having a tapered head 8 at one end and threaded at its opposite end. The head 8 fits into a tapered seat formed in the link 2, and a similar seat is formed in the link 3 to receive a tapered bushing 9 which is split as indicated in Fig. 1, and is of such dimensions that it can slide freely on the body of the bolt 7. A nut 10 is threaded on the bolt and a spring washer 12 is interposed between the nut 10 and the bushing 9 where it yieldingly transmits the pressure of the nut to the bushing. Preferably a self-lubricating bushing 13 is interposed between the bolt 7 and the spring eye 5, and washers 14 and 15 made of material similar to that of the bushing 13 are placed between the ends of the eye 5 and the inner faces of the links 2 and 3 respectively. These washers and bushings may be made of wood, fiber or of a heavy asbestos fabric treated with hardening and lubricating compounds, or of any other suitable anti-friction material.

It will now be understood that the spring washer 12 tends to relatively move the tapered members 8 and 9 toward each other. This force not only holds these tapered parts firmly in their seats in the links 2 and 3, but it urges the links toward each other and thus presses the washers 14 and 15 against the opposite ends of the spring eye 5. It is obvious that if a suitably designed washer 12 is selected, this force may be made very considerable and that it will thus constantly maintain a tight connection between the bolt 7 and the links 2 and 3 as the parts become worn, and will automatically take up any wear that occurs either radially or longitudinally of the bolt. This construction thus eliminates any opportunity for the development of a rattle between the bolt and the shackle links. At the same time, the connection between the bolt and the spring eye avoids any possibility of a rattle developing between these parts. After a substantial period of service, the nut 10 should be turned up somewhat in order to increase the tension of the spring washer 12, which tension may have become reduced due to the wear between the links and the tapered parts 8 and 9.

As the bushing 9 is forced inwardly, its split construction enables it to contract so that it fits tightly about the body of the bolt while also fitting in the seat in the link.

The connection between the hanger 4 and the links 2 and 3 preferably is exactly like that between the links and the spring eye 5. Consequently no detailed description of it is necessary.

This construction not only effectually avoids any possibility of developing sufficient looseness in any of the connections to produce a rattle, but it effects a very substantial saving in the processes of manufacture and assembling. That is, this construction avoids any necessity for hardening or grinding the parts. The links may be drop forged and then drilled and reamed in a jig, while the bolt can be made of cold rolled stock. It is obvious that the parts can be very quickly assembled, and even if the holes in the links are a trifle out of line, the wear between the tapered parts 8 and 9 and the holes in the links will soon form true seats for the tapered members.

What is claimed as new, is:

1. The combination with a spring eye, of a bolt extending through said eye, means for supporting said bolt at opposite ends of said eye, and means for automatically taking up wear between said bolt and said supporting means both longitudinally and radially of said bolt.

2. The combination with a spring eye, of a bolt extending through said eye, means for supporting said bolt at opposite ends of said eye, and means for automatically maintaining a tight connection between said bolt and said supporting means notwithstanding the tendency of said connection to become loose as the parts wear.

3. The combination with a spring eye, of a bolt extending through said eye, means for supporting said bolt at opposite ends of said eye, said supports having tapered seats to receive said bolt and said bolt being provided with tapered members relatively adjustable to fit in said seats, and means tending constantly to effect a relative movement of said tapered members to urge them into their seats.

4. The combination with a spring eye, of a bolt extending through said eye, supports for said bolt at opposite ends of said eye, said supports being provided with tapered seats, a tapered head on said bolt fitting in one of said seats, a tapered bushing adjustable longitudinally of said bolt and fitting in the other seat, a nut threaded on said bolt, and a spring washer between said bushing and said nut acting to urge said bushing into its seat.

5. The combination with a spring eye, of a bolt extending through said eye, means for supporting said bolt at the opposite ends of said eye, and means for automatically taking up wear between said eye and said supporting means and between said supporting means and said bolt.

6. The combination with a spring eye, of a bolt extending through said eye, means for supporting said bolt at opposite ends of said eye, means for automatically maintaining a tight connection between said bolt and said supporting means notwithstanding the tendency of said connection to become loose as the parts wear, and anti-friction means interposed between said supporting means and said eye and between said bolt and said eye.

7. The combination with a spring eye, of shackle links at opposite ends of said eye, a bolt extending through said links and said eye, said links being provided with tapered seats, a tapered head on said bolt fitting in one of said seats, a split tapered bushing on said bolt fitting in the other seat, a spring washer bearing against said bushing, and a nut threaded on said bolt and bearing against said washer, whereby the pressure of said washer urges said bushing and said bolt head into their tapered seats and thereby forces said links toward said spring eye.

8. The combination with a spring eye, of shackle links at opposite ends of said eye, a bolt extending through said links and said eye, an anti-friction bushing between said bolt and said eye, anti-friction washers between the opposite ends of said eye and said links, and means coöperating with said bolt to press said links yieldingly toward each other.

In testimony whereof I have signed my name to this specification.

ERIK H. DELLING.